US012385565B2

(12) United States Patent
Sato (10) Patent No.: US 12,385,565 B2
(45) Date of Patent: Aug. 12, 2025

(54) METAL GASKET (71) Applicant: VALQUA, LTD., Tokyo (JP)

(72) Inventor: Koji Sato, Gojo (JP)

(73) Assignee: VALQUA, LTD., Tokyo (JP)

( * ) Notice: Subject to any disclaimer, the term of this patent is extended or adjusted under 35 U.S.C. 154(b) by 0 days.

(21) Appl. No.: 18/032,591

(22) PCT Filed: Oct. 15, 2021

(86) PCT No.: PCT/JP2021/038177
§ 371 (c)(1),
(2) Date: Apr. 19, 2023

(87) PCT Pub. No.: WO2022/085577
PCT Pub. Date: Apr. 28, 2022

(65) Prior Publication Data
US 2023/0392691 A1 Dec. 7, 2023

(30) Foreign Application Priority Data
Oct. 20, 2020 (JP) .................................. 2020-175744

(51) Int. Cl.
*F16J 15/08* (2006.01)
(52) U.S. Cl.
CPC .................................. *F16J 15/0806* (2013.01)
(58) Field of Classification Search
CPC ... F16J 15/0887; F16J 15/0893; F16J 15/0806
See application file for complete search history.

(56) References Cited

U.S. PATENT DOCUMENTS 3,090,630 A * 5/1963 Gasche ................ F16J 15/0887
285/917
3,161,318 A * 12/1964 Krueger ............... F16J 15/0887
220/378
(Continued)

FOREIGN PATENT DOCUMENTS

| JP | S62-28958 U | 2/1987 |
| JP | H09-177976 A | 7/1997 |

(Continued)

OTHER PUBLICATIONS

International Search Report and Written Opinion mailed on Jan. 11, 2022, received for PCT Application PCT/JP2021/038177, filed on Oct. 15, 2021, 8 pages including English Translation.

(Continued)

*Primary Examiner* — Eugene G Byrd
(74) *Attorney, Agent, or Firm* — XSENSUS LLP (57) ABSTRACT A metal gasket having an annular planar shape with a vertical cross-section having a sideways U-shape has angular portions in an upper surface portion and a lower surface portion, respectively. In the angular portions, inclined faces inclined toward the inner peripheral direction and having a minimum thickness portion with a thickness corresponding to 3-25% of the height of the metal gasket are formed at a boundary between an upper surface of the upper member and an inner peripheral surface of an inner peripheral portion and a boundary between a lower surface of the lower surface portion and the inner peripheral surface of the inner peripheral portion, respectively. A height from the upper surface of the upper surface portion to a vertex of the angular portion and a height from the lower surface of the lower surface portion to a vertex of the angular portion are 0.01 mm or greater.

9 Claims, 4 Drawing Sheets (56) References Cited

U.S. PATENT DOCUMENTS

| | | | |
|---|---|---|---|
| 4,877,272 A * | 10/1989 | Chevallier | F16J 15/0887 |
| | | | 285/212 |
| 6,945,539 B2 | 9/2005 | Whitlow et al. | |
| 9,845,875 B2 * | 12/2017 | Doyle | F16J 15/0893 |
| 2003/0164594 A1 | 9/2003 | Whitlow et al. | |
| 2004/0041353 A1 | 3/2004 | Tanioka et al. | |
| 2006/0055122 A1 * | 3/2006 | Itoi | F16J 15/0881 |
| | | | 277/602 |
| 2011/0223471 A1 * | 9/2011 | Sato | H01M 50/184 |
| | | | 277/648 |
| 2013/0193650 A1 * | 8/2013 | Tohdoh | F16J 15/0887 |
| | | | 277/590 |
| 2022/0003317 A1 | 1/2022 | Sato | |

FOREIGN PATENT DOCUMENTS

| | | | | |
|---|---|---|---|---|
| JP | H11-30333 A | | 2/1999 | |
| JP | 2000-304132 A | | 11/2000 | |
| JP | 2002-364750 A | | 12/2002 | |
| JP | 2003-156147 A | | 5/2003 | |
| JP | 2003-194225 A | | 7/2003 | |
| JP | 2004176835 A | * | 6/2004 | F16J 15/0881 |
| JP | 2005-517883 A | | 6/2005 | |
| WO | 2020/075484 A1 | | 4/2020 | |

OTHER PUBLICATIONS

Extended European Search Report issued Aug. 12, 2024 in European Patent Application No. 21882718.6.

* cited by examiner

METAL GASKET

CROSS-REFERENCE TO RELATED APPLICATIONS

The present application is based on PCT filing PCT/JP2021/038177, filed Oct. 15, 2021, which claims priority to Japanese Application No. 2020-175744, filed Oct. 20, 2020, the entire contents of each are incorporated herein by reference.

TECHNICAL FIELD

The present invention relates to a metal gasket. More specifically, the present invention relates to a metal gasket which is used for connecting pipes, devices, and the like, for example, in a thermal electric power plant, a nuclear power plant, a steam engine of a steam turbine ship, a petroleum refining line, a petrochemical industry process line, a semiconductor manufacturing line, and the like.

BACKGROUND ART

A hollow metal O-ring and a spring-loaded metal C-ring have been proposed as metal gaskets having excellent heat resistance (see, for example, Patent Literature 1 and Patent Literature 2). These metal gaskets however have drawbacks such that a fastening force required for sealing between flanges is so large.

In order to reduce a tightening force between flanges, a jacket seal provided with a protrusion that abuts on a seal surface of a member to be sealed (see, for example, Patent Literature 3), and a seal provided with an upper load concentration protrusion and a lower load concentration protrusion (see, for example, Patent Literature 4) have been proposed. However, it is difficult to ensure high sealing performance, because it is difficult to manufacture a projection with high accuracy in the jacket seal provided with the projection, and the seal provided with the upper load concentration projection and the lower load concentration projection.

PRIOR ART LITERATURES

Patent Literatures

Patent Literature 1: Japanese Patent Unexamined Publication No. H9-177976
Patent Literature 2: Japanese Patent Unexamined Publication No. H11-30333
Patent Literature 3: Japanese Patent Unexamined Publication No. 2000-304132
Patent Literature 4: Japanese Patent Unexamined Publication No. 2005-517883

SUMMARY OF THE INVENTION

Problems to be Solved by the Invention

The present invention has been made in view of the above-mentioned prior art. An object of the present invention is to provide a metal gasket capable of securing sealability between the metal gasket and a material to be sealed, such as a flange by fastening the material to be sealed with a small tightening force, and capable of reducing a force necessary for completely tightening a fastening member such as a bolt.

Means for Solving the Problems

The present invention relates to:
(1) a metal gasket having an opening on an outer peripheral end, an annular shape in a plane shape, and a lateral channel shape or a horizontal U-shape in a vertical sectional view,
wherein the metal gasket has an upper member, an inner peripheral member and a lower member,
wherein an inclined face toward an inner peripheral direction is formed at a boundary between an upper surface of the upper member and an inner surface of the inner peripheral member, and at a boundary between an under surface of the lower member and an inner surface of the inner surface member, respectively, and the inclined face has an area of a minimum thickness of 3 to 25% of the height of the metal gasket,
wherein each of the upper member and the lower member has an angular portion having a shape of a mountain in a vertical sectional view, respectively, and each of a height from the upper surface of the upper member to an apex of the angular portion having a shape of a mountain on the upper member and a height from the lower surface of the lower member to an apex of the angular portion having a shape of a mountain on the lower member is 0.01 mm or more, respectively, and
wherein a distance between a lower surface of the upper member and an upper surface of the lower member in the opening is 20 to 90% of the height of the metal gasket; and
(2) the metal gasket according to the above-mentioned item (1), wherein the metal gasket is formed from a metal selected from the group consisting of aluminum, an aluminum alloy, stainless steel, Inconel, carbon steel, lead, gold, silver, copper, nickel, tantalum, chromium molybdenum steel, Monel, titanium and a magnesium alloy.

Effects of the Invention

According to the present invention, there is provided a metal gasket capable of securing sealability between the metal gasket and a material to be sealed, such as a flange by fastening the material to be sealed with a small tightening force, and capable of reducing a force necessary for completely tightening a fastening member such as a bolt.

MODE FOR CARRYING OUT THE INVENTION

As described above, the metal gasket according to the present has an opening on an outer peripheral end, an annular shape in a plane shape, and a lateral channel shape or a horizontal U-shape in a vertical sectional view.

The metal gasket according to the present invention has an upper member, an inner peripheral member and a lower member, wherein an inclined face toward an inner peripheral direction is formed at a boundary between an upper surface of the upper member and an inner surface of the inner peripheral member and at a boundary between an under surface of the lower member and an inner surface of the inner surface member, respectively, and an area having the inclined face has a minimum thickness of 3 to 25% of the height of the metal gasket, wherein each of the upper member and the lower member has an angular portion having a shape of a mountain in a vertical sectional view, respectively, and each of a height from the upper surface of the upper member to an apex of the angular portion having a shape of a mountain on the upper member and a height from the lower surface of the lower member to an apex of the angular portion having a shape of a mountain on the lower member is 0.01 mm or more, respectively, and wherein a distance between a lower surface of the upper member and an upper surface of the lower member in the opening is 20 to 90% of the height of the metal gasket.

Since the metal gasket according to the present invention has the above-mentioned configuration, the metal gasket exhibits excellent effects such that sealability between the metal gasket and a material to be sealed, such as a flange can be secured by fastening the material to be sealed with a small tightening force, and that a force necessary for completely tightening a fastening member such as a bolt can be reduced.

Incidentally, the above-mentioned material to be sealed means a member which is fastened by the metal gasket according to the present invention. Representative examples of the material to be sealed include a flange which is formed at an end of a tubular body such as a steel pipe, a connecting part of a device, and the like.

The metal gasket according to the present invention will be more specifically described below with reference to drawings. The metal gasket according to the present invention is not limited only to embodiments shown in the drawings, and may have other embodiments as long as the metal gasket is included in a scope of the present invention.

Figure 1:
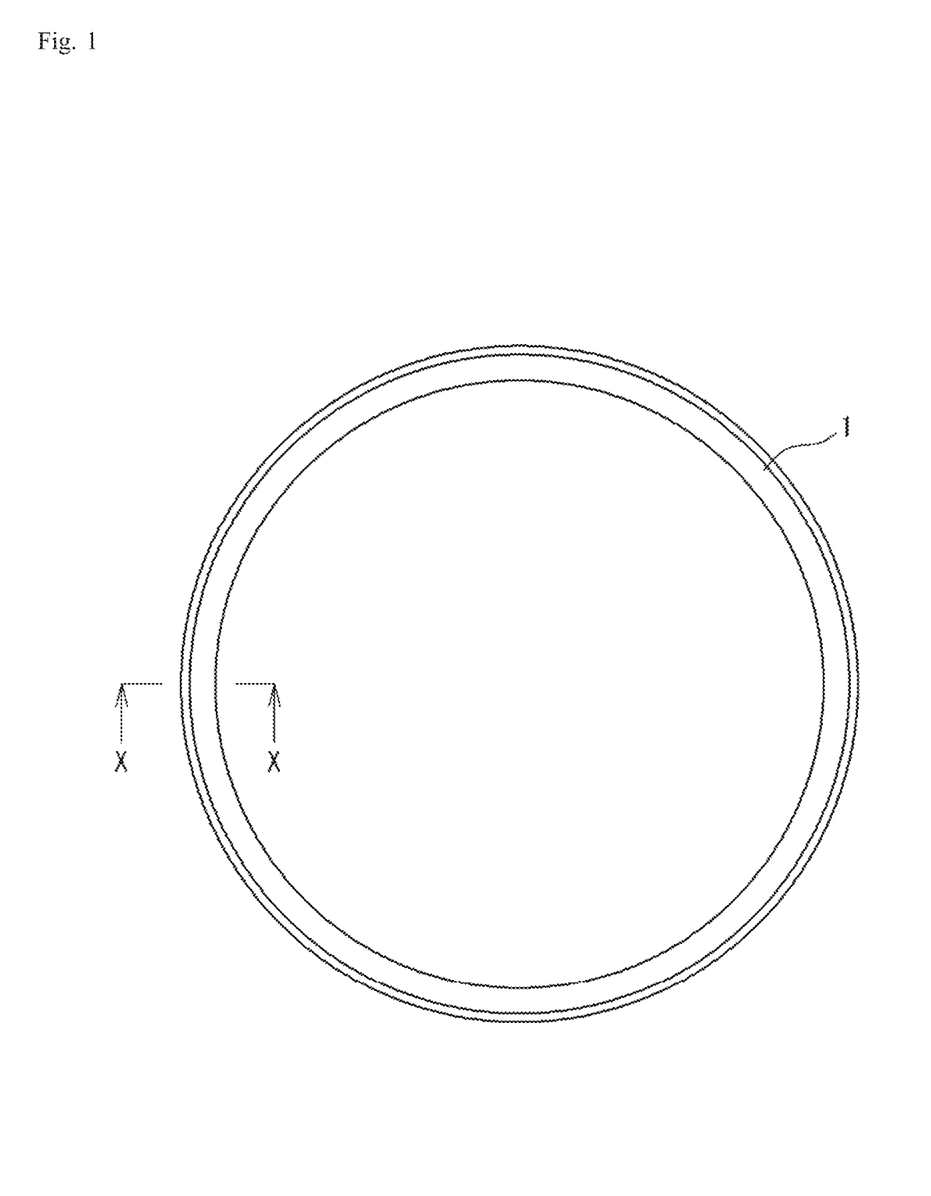
FIG. 1 is a schematic side view showing one embodiment of the metal gasket according to the present invention.
Figure 2:
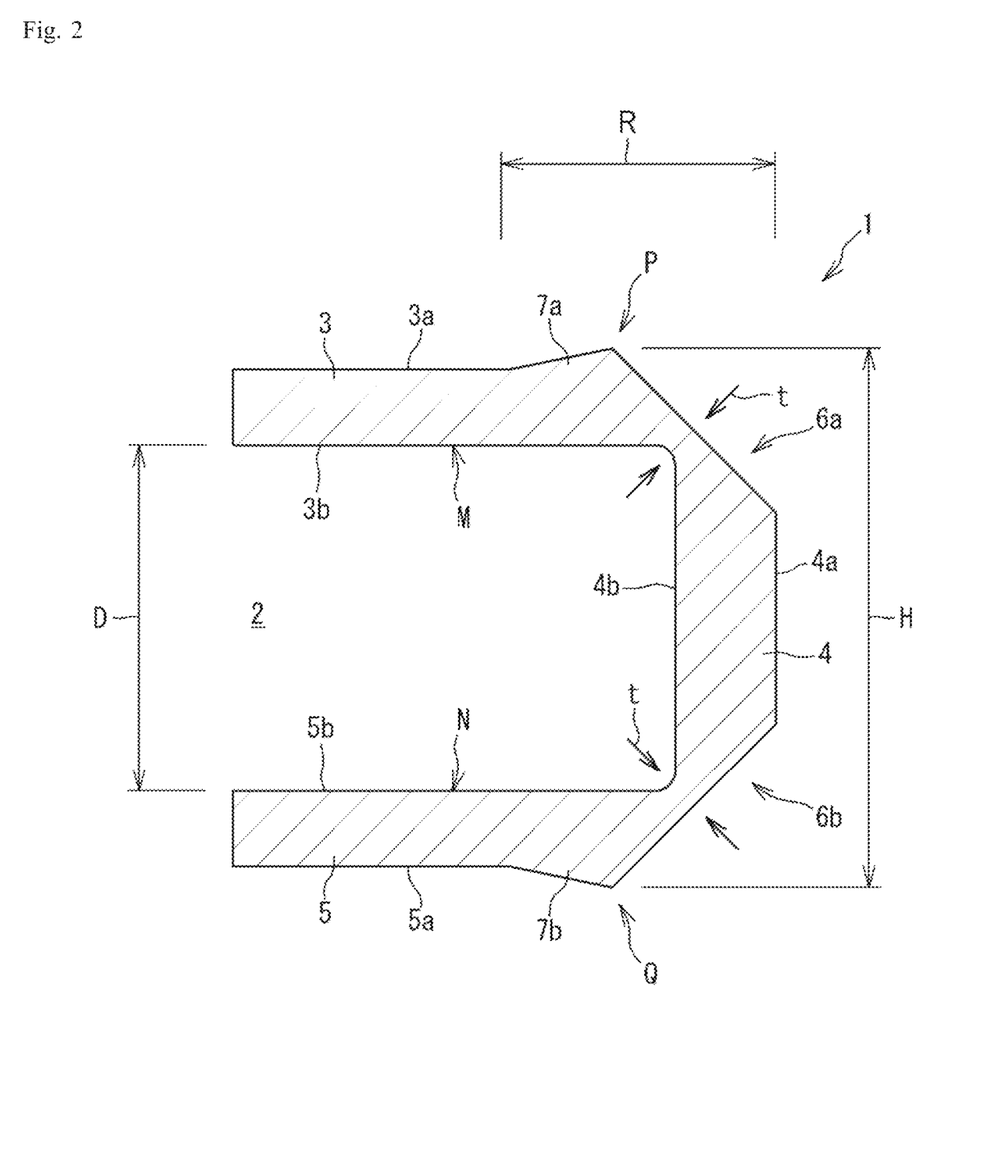
FIG. 2 is a schematic cross-sectional view of an X-X section of the metal gasket according to the present invention shown in FIG. 1.
Figure 3:
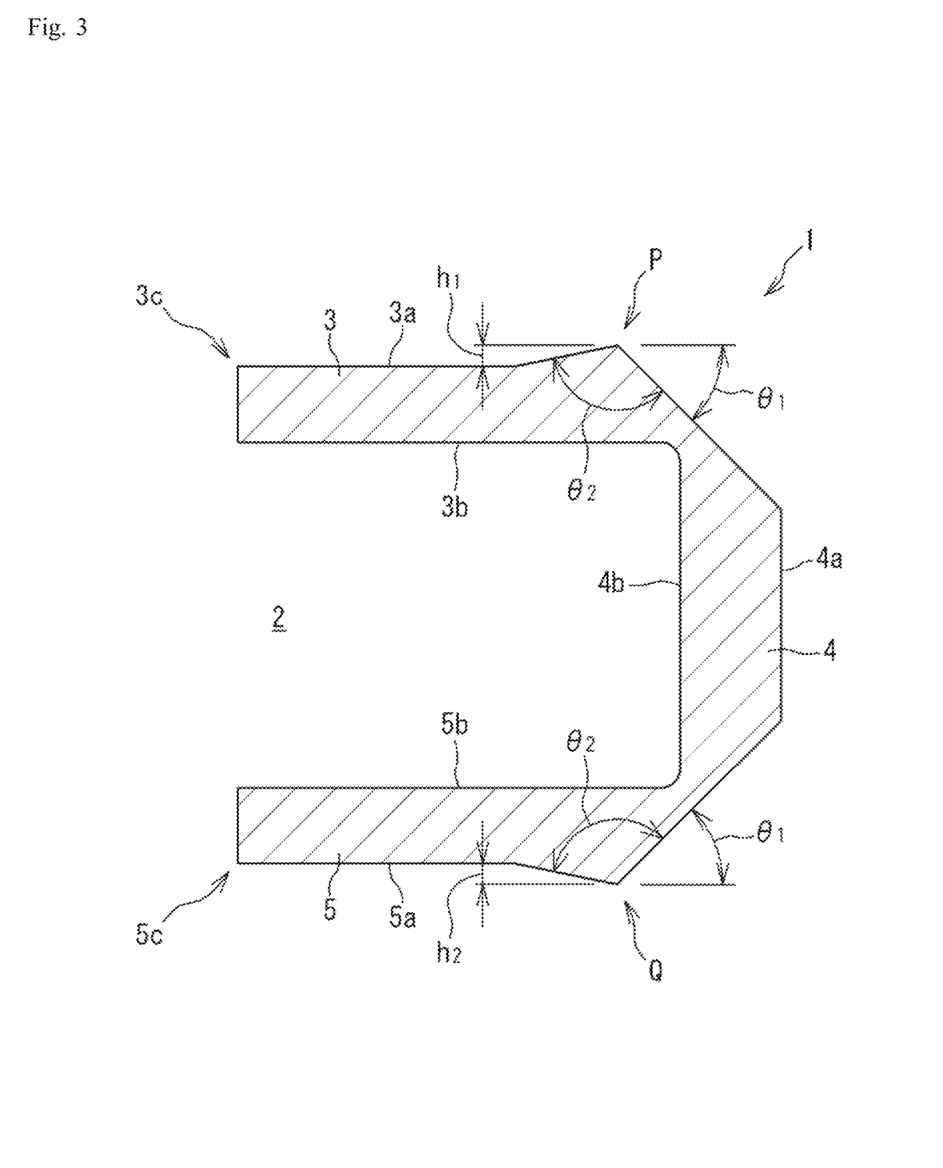
FIG. 3 is a schematic cross-sectional view of the X-X section of the metal gasket according to the present invention shown in FIG. 1.

FIG. 1 is a schematic side view showing one embodiment of the metal gasket 1 according to the present invention. Each of FIG. 2 and FIG. 3 is a schematic cross-sectional view of an X-X section of the metal gasket according to the present invention shown in FIG. 1. For convenience of explanation of the metal gasket 1 according to the present invention, reference numerals of main parts of the metal gasket 1 according to the present invention are mainly described in FIG. 2, and reference numerals of parts other than the main parts of the metal gasket 1 according to the present invention are described in FIG. 3.

As shown in FIG. 1, the metal gasket 1 has an annular planar shape. The annular planar shape includes, for example, a circular shape, a square shape, a polygonal shape such as a rectangular shape, and the like, and the present invention is not limited only to those planar shapes. Incidentally, the circular shape includes not only a perfect circle but also a vertically long elliptical shape, a horizontally long elliptical shape and a track elliptical shape. When the metal gasket 1 has a polygonal shape, it is preferred that a corner of the polygonal shape has an arc having a radius of to 0.5 mm or so in order to avoid a sharp corner.

As shown in FIG. 2 and FIG. 3, the metal gasket 1 includes an upper member 3, an inner peripheral member 4 and a lower member 5. The upper member 3 is connected with the inner peripheral member 4, and the inner peripheral member 4 is connected with the lower member 5.

As shown in FIG. 2 and FIG. 3, the longitudinal sectional shape of the metal gasket 1 is a longitudinal sectional shape of a lateral channel shape or a horizontal U-shape. Among these longitudinal sectional shapes, the longitudinal sectional shape of a lateral channel shape is preferable, from the viewpoint of securing sealability between the metal gasket and the material to be sealed, such as a flange by fastening the material to be sealed with a small tightening force, and reducing a force necessary for completely tightening a fastening member such as a bolt.

When the longitudinal sectional shape of the metal gasket 1 is a longitudinal sectional shape of a lateral channel shape, an inner peripheral surface 4a of the inner peripheral member 4 (inner surface in the circumferential direction of the opening 2) of the metal gasket 1 can be a flat surface as shown in FIG. 2 and FIG. 3, a curved surface, a surface having a corner, or a surface having unevenness.

When the longitudinal sectional shape of the metal gasket 1 is a horizontal U-shape, the longitudinal sectional shape of the inner peripheral member 4 of the metal gasket 1 is an arc shape. For convenience of explanation, the metal gasket 1 having a horizontal U-shape means that the metal gasket 1 has a horizontal U-shape in a longitudinal section. The horizontal U-shape in a longitudinal section includes a concept of a C-shape having an inside wider than the opening 2 in a longitudinal section.

As shown in FIG. 2, the metal gasket 1 has the opening 2 on the outer peripheral end. The outer peripheral surface 4b of the inner peripheral member 4 inside the opening 2 of the metal gasket 1 can be a flat surface as shown in FIG. 2, a surface having an arc, or a surface having unevenness.

In the embodiment shown in FIG. 2, an arc is formed at the boundary between the lower surface 3b of the upper member 3 and the outer peripheral surface 4b of the inner peripheral member 4, and at the boundary between the upper surface 5b of the lower member 5 and the outer peripheral surface 4b of the inner peripheral member 4. However, the boundary can have a corner or a slope.

In the embodiment shown in FIG. 2, the lower surface 3b of the upper member 3 and the upper surface 5b of the lower member 5 are parallel to the plane of the metal gasket 1 (horizontal plane of the metal gasket 1), respectively. A taper (slope) can be formed on the lower surface 3b and the upper surface 5b.

In the embodiments shown in FIG. 2 and FIG. 3, the internal of the opening 2 is vacant. An elastic body (not shown in the figure) can be placed inside the opening 2 as occasion demands. The elastic body usually has a shape corresponding to the shape of the inside of the opening 2 of the metal gasket 1. The elastic body can be placed in the opening 2 so as to be in contact with the inner wall of the opening 2 of the metal gasket 1. A gap can be formed between the elastic body and the inner wall of the opening 2 by forming an uneven shape on the surface of the elastic body, or by forming a longitudinal sectional shape of the elastic body into a circular shape, a triangular shape or the like.

The material which constitutes the elastic body include, for example, rubbers such as fluorocarbon rubber, silicone rubber, butadiene rubber, styrene-butadiene rubber, acrylonitrile-butadiene rubber, chloroprene rubber and natural rubber; thermoplastic elastomers such as olefin-based thermoplastic elastomers, ester-based thermoplastic elastomers, styrene-based thermoplastic elastomers and vinyl chloride-based thermoplastic elastomers; thermoplastic resins having high flexibility, such as fluorocarbon resins such as polytetrafluoroethylene; metals such as an aluminum alloy, stainless steel, Inconel, carbon steel, lead, gold, silver, copper, nickel, tantalum, chromium molybdenum steel, Monel, titanium and magnesium alloy; and the like. The present invention is not limited only to those exemplified ones. Among these materials which constitute the elastic body, the fluorocarbon rubber and the silicone rubber are preferable, and the fluorocarbon rubber is more preferable, from the viewpoint of obtaining the metal gasket 1 which is excellent in heat resistance, which can secure sealability between the metal gasket 1 and a material to be sealed (not shown in the figure), such as a flange when the material to be sealed is fastened with a small tightening force, and which can secure sealability between the metal gasket 1 and the material to be sealed even when thermal history is applied to the metal gasket 1. In addition, as the elastic body, for example, a coil spring or the like can be used.

An inclined face 6a inclining toward an inner peripheral direction of the metal gasket 1 is formed on the upper member 3 at a boundary between an upper surface 3a of the upper member 3 and an inner peripheral surface 4a of the inner peripheral member 4, and an inclined face 6b inclining toward the inner peripheral direction of the metal gasket 1 is formed on the lower member 5 at a boundary between a lower surface 5a of the lower member 5 and the inner peripheral surface 4a of the inner peripheral member 4, respectively, from the viewpoint of securing of sealability between the metal gasket 1 and the material to be sealed, such as a flange when the material to be sealed is fastened with a small tightening force, and reduction of a force necessary for completely tightening a fastening member such as a bolt.

An angle (inclination angle) $\theta_1$ between each of the inclined faces 6a, 6b and a horizontal surface of the metal gasket 1 is not particularly limited. The angle is preferably 20° to 80°, and more preferably 30° to 55°, respectively, from the viewpoint that the material to be sealed can be tightened with a small tightening force.

An area t having a minimum thickness which is 3 to 25% of the height H of the metal gasket 1 is formed on the inclined faces 6a, 6b of the metal gasket 1, respectively, from the viewpoint of securing of sealability between the metal gasket 1 and the material to be sealed, such as a flange when the material to be sealed is fastened with a small tightening force, and reduction of a force necessary for completely tightening a fastening member such as a bolt. The area t having a minimum thickness is an area where each of the inclined faces 6a, 6b has the smallest thickness as shown in FIG. 2 and FIG. 3. The area t having the minimum thickness formed on the inclined faces 6a, 6b has a thickness of 3% or more of the height H of the metal gasket 1, respectively, from the viewpoint of improvement in sealability between the metal gasket 1 and the material to be sealed, and the area t has a thickness of 25% or less of the height H of the metal gasket 1, from the viewpoint of making it possible to fasten the material to be sealed with a small fastening force.

The height H of the metal gasket 1 cannot be absolutely determined because the height H differs depending on uses of the metal gasket 1, and the like. Therefore, it is preferred that the height H is appropriately adjusted in accordance with the uses of the metal gasket 1, and the like. To give an example of the height H, the height H is, for example, 1.5 to 15 mm or so.

Each of the upper surface 3a of the upper member 3, the inner peripheral surface 4a of the inner peripheral member 4, and the lower surface 5a of the lower member 5 usually has a flat surface. A shape such as an uneven shape, a waveform shape or a curved shape may be formed on the upper surface 3a, the inner peripheral surface 4a and the lower surface 5a within a scope which would not hinder an object of the present invention.

In the embodiments shown in FIG. 2 and FIG. 3, each of the upper surface 3a of the upper member 3 and the lower surface 5a of the lower member 5 of the metal gasket 1 is horizontal with respect to the metal gasket 1. However, each of the upper surface 3a and the lower surface 5a may not always be horizontal with respect to the metal gasket 1, and each of the upper surface 3a and the lower surface 5a may have an inclination within a range which would not hinder an object of the present invention.

The metal gasket 1 has an apex P and an angular portion 7a having a mountain-shaped longitudinal section on the upper member 3, and an apex Q and an angular portion 7b having a mountain-shaped longitudinal section on the lower member 5.

As shown in FIG. 3, it is preferred that the apex P is formed on an extension line of the inclined face 6a of the upper member 3, and it is more preferred that the apex P is formed on a coplanar extension line of the inclined face 6a of the upper member 3, from the viewpoint of securing of sealability between the metal gasket 1 and the material to be sealed, such as a flange when the material to be sealed is fastened with a small tightening force, and reduction of a force necessary for completely tightening a fastening member such as a bolt. In addition, it is preferred that the apex Q is formed on an extension line of the inclined face 6b of the lower member 5, and it is more preferred that the apex Q is formed on a coplanar extension line of the inclined face 6b of the lower member 5, from the viewpoint of securing of sealability between the metal gasket 1 and the material to be sealed, such as a flange when the material to be sealed is fastened with a small tightening force, and reduction of a force necessary for completely tightening a fastening member such as a bolt.

Each of a height $h_1$ from the upper surface 3a of the upper member 3 to the apex P of the angular portion 7a having a shape of a mountain, and a height $h_2$ from the lower surface 5a of the lower member 5 to the apex Q of the angular portion 7b having a shape of a mountain is 0.01 mm or more, respectively. The metal gasket 1 is brought into contact with the material to be sealed at the angular portions 7a, 7b.

According to the present invention, since the angular portions 7a, 7b each having a shape of a mountain in a vertical sectional view are formed on the metal gasket 1, and each of the height $h_1$ and the height $h_2$ is 0.01 mm or more, respectively, sealing property between the metal gasket 1 and the material to be sealed can be ensured by fastening the material to be sealed with a small tightening force, and a stress necessary for completely tightening the fastening member can be reduced.

Incidentally, the upper limit of the height $h_1$ and the upper limit of the height $h_2$ are not particularly limited, respectively. Each of the upper limit of the height $h_1$ and the upper limit of the height $h_2$ is preferably 0.3 mm or less, and more preferably mm or less, respectively, from the viewpoint of making it possible to secure sealability between the metal gasket 1 and the material to be sealed when the material to be sealed is fastened with a small tightening force, and making it possible to reduce a force necessary for completely tightening a fastening member.

As shown in FIG. 2, the apex P of the angular portion 7a and the apex Q of the angular portion 7b may be sharp or rounded, respectively. However, it is preferred that the apex P and the apex Q are sharp, from the viewpoint of making it possible to secure sealability between the metal gasket 1 and the material to be sealed when the material to be sealed is fastened with a small tightening force, and making it possible to reduce a force necessary for completely tightening a fastening member.

In FIG. 3, an angle $\theta_2$ at the apex P of the angular portion 7a and an angle $\theta_2$ at the apex Q of the angular portion 7b are not particularly limited. Each of the angle $\theta_2$ at the apex P and the angle $\theta_2$ at the apex Q is preferably 10° to 160°, more preferably 30° to 150°, furthermore preferably 60° to 140°, and even more preferably to 140°, respectively, from the viewpoint of making it possible to secure sealability between the metal gasket 1 and the material to be sealed when the material to be sealed is fastened with a small tightening force, and making it possible to reduce a force necessary for completely tightening a fastening member.

As shown in FIG. 2, each of the inclined face of the angular portion 7a and the inclined face of the angular portion 7b can be a smooth surface, a surface having a waveform, or a surface having irregularities.

As shown in FIG. 2, it is preferred that each position of the apex P of the angular portion 7a and the apex Q of the angular portion 7b in the horizontal direction is present in a region R between the intermediate point of the width of the metal gasket 1 and the inner peripheral surface 4a of the inner peripheral member 4 of the metal gasket 1, from the viewpoint of securing of sealability between the metal gasket 1 and the material to be sealed, such as a flange when the material to be sealed is fastened with a small tightening force, and reduction of a force necessary for completely tightening a fastening member such as a bolt.

The width of the metal gasket 1 is a length from the inner peripheral surface 4a of the inner peripheral member 4 to the outer peripheral end 3c of the upper member 3 of the metal gasket 1, or a length from the inner peripheral surface 4a of the inner peripheral member 4 to the outer peripheral end 5c of the lower member 5 of the metal gasket 1.

As shown in FIG. 2, it is preferred that the apex P of the angular portion 7a is present between the outer peripheral surface 4b of the inner peripheral member 4 and the midpoint M of the lower surface 3b of the upper member 3 in the horizontal direction, and that the apex Q of the angular portion is present between the outer peripheral surface 4b of the inner peripheral member 4 and the intermediate point N of the upper surface 5b of the lower member 5 7b in the horizontal direction, respectively, from the viewpoint of making it possible to secure sealability between the metal gasket 1 and the material to be sealed when the material to be sealed is fastened with a small tightening force.

A distance D between the lower surface 3b of the upper member 3 and the upper surface 5b of the lower member 5 is 20% or more, and preferably 25% or more of the height H of the metal gasket 1, from the viewpoint of making it possible to secure sealability between the metal gasket 1 and the material to be sealed when the material to be sealed is fastened with a small tightening force, and reducing of a force necessary for completely tightening a fastening member. The distance D is 90% or less, and preferably 80% or less of the height H, from the viewpoint of improvement in sealability between the metal gasket 1 and the material to be sealed.

The diameter of the metal gasket 1 in a plan view cannot be absolutely determined because the diameter differs depending on uses of the metal gasket 1, and the like. It is preferred that the diameter of the metal gasket 1 is appropriately determined in accordance with the uses of the metal gasket 1 and the like, and is usually 2 mm to 3 m or so.

The width of the metal gasket 1 cannot be absolutely determined because the width differs depending on uses of the metal gasket 1, and the like. It is preferred that the width of the metal gasket 1 is appropriately determined in accordance with the uses of the metal gasket 1 and the like, and is usually 1 to 15 mm or so.

The material of the metal gasket 1 is preferably a metal selected from the group consisting of aluminum, an aluminum alloy, stainless steel, Inconel, carbon steel, lead, gold, silver, copper, nickel, tantalum, chromium molybdenum steel, Monel, titanium and a magnesium alloy, more preferably a metal selected from the group consisting of aluminum, the aluminum alloy, stainless steel and Inconel, further preferably aluminum, the aluminum alloy or stainless steel, and furthermore preferably aluminum or the aluminum alloy, from the viewpoint of securing of sealability between the metal gasket 1 and the material to be sealed when the material to be sealed is fastened with a small tightening force.

The aluminum alloy includes, for example, aluminum-iron alloy, aluminum-copper alloy, aluminum-manganese alloy, aluminum-magnesium alloy, aluminum-zinc alloy, aluminum-nickel alloy and the like, and the present invention is not limited only to those exemplified ones.

The stainless steel includes, for example, SUS304, SUS316, SUS430, SUS630, SUS631, SUS633, SUS420J2 and the like, and the present invention is not limited only to those exemplified ones.

In addition, the metal other than magnesium used in the magnesium alloy includes, for example, lithium, calcium, aluminum, zinc, titanium, manganese, zirconium, yttrium, tantalum, neodymium, niobium and the like, and the present invention is not limited only to those exemplified ones.

A plating layer, a coating layer (coating film) or the like can be formed on the surface of the metal gasket 1 within a scope which would not hinder an object of the present invention.

When the metal gasket 1 configured as described above is inserted between the materials to be sealed such as flanges, and tightened, since the angular portions 7a, 7b each having a predetermined height are pressed by the material to be sealed, and the metal gasket 1 is appropriately bent, sealing property between the metal gasket 1 and the material to be sealed can be ensured even when the material to be sealed is tightened with a small tightening force. Furthermore, when the fastening member is completely tightened between the materials to be sealed, since the opening 2 having the distance D between the lower surface 3b of the upper member 3 and the upper surface 5b of the lower member 5 is formed in a predetermined ratio with respect to the height of the metal gasket 1, a stress necessary for completely tightening the fastening member can be reduced.

Accordingly, the metal gasket 1 of the present invention is capable of securing sealability between the metal gasket 1 and the material to be sealed, such as a flange by fastening the material to be sealed with a small tightening force, and moreover capable of reducing a force necessary for completely tightening the fastening member such as a bolt until the fastening member is completely tightened, so that the fastening member can be miniaturized, and the number of the fastening member can be reduced. Therefore, the metal gasket 1 according to the present invention can be suitably used for connecting pipes, devices, and the like, for example, in a thermal power plant, a nuclear power plant, a steam engine of a steam turbine ship, a petroleum refining line, a process line of petrochemical industry, a semiconductor manufacturing line, and the like.

EXAMPLES

Next, the metal gasket according to the present invention will be more specifically described based on working examples. However, the present invention is not limited only to embodiments described in the working examples.

Example 1

As a metal gasket, a metal gasket 1 made of aluminum, having a longitudinal sectional shape shown in FIG. 2 and FIG. 3 was used.

More specifically, the metal gasket 1 had a circular planar shape; each of the apex P and the apex Q was present within the range of the region R, respectively; the height H of the metal gasket 1 was 3.2 mm; the inner diameter of the metal gasket 1 was 20 mm; and the outer diameter of the metal gasket 1 was 25 mm. Each thickness of the upper member 3, the inner peripheral member 4 and the lower member 5 of the metal gasket 1 was 0.3 mm, respectively. The angle (inclination angle) $\theta_1$ between each of the inclined faces 6a, 6b and the horizontal surface of the metal gasket 1 was respectively, and the angle $\theta_2$ at each of the apex P and the apex Q of the angular portions 7a, 7b was 125°, respectively.

The minimum thickness portion t having a thickness of 15% of the height H of the metal gasket 1 was formed on the inclined face 6a of the upper member 3 and the inclined face 6b of the lower member 5 of the metal gasket 1, respectively. Each of the height $h_1$ and the height $h_2$ was 0.01 mm, respectively. The metal gasket 1 having the opening 2, in which the distance D between the lower surface 3b of the upper member 3 and the upper surface 5b of the lower member 5 was 40% of the height of the metal gasket 1, was used.

As the properties of the metal gasket 1, a load at start of sealing and a load at end of tightening were examined in accordance with the following methods. The results are shown in Table 1.

Figure 4:
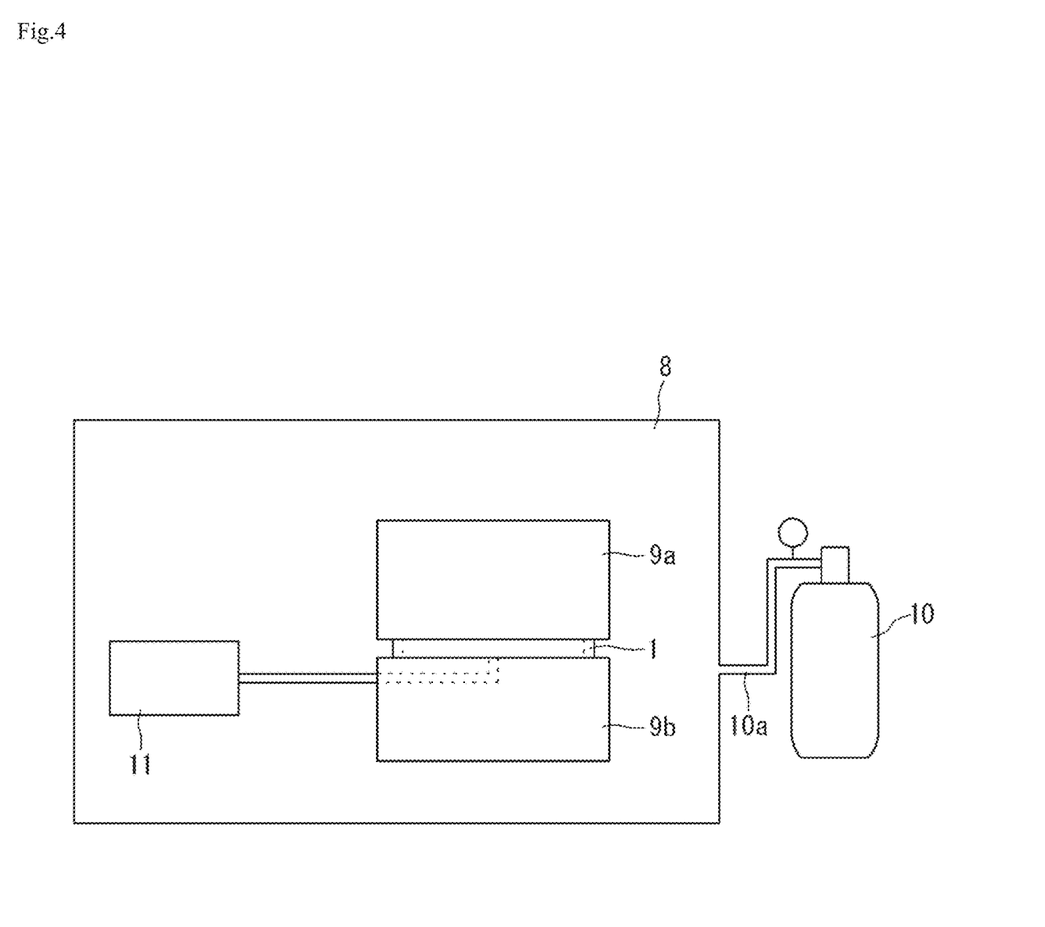
FIG. 4 is a schematic explanatory drawing of an evaluation test device for evaluating a metal gasket used in each of working examples and each of comparative examples.

Incidentally, the load at start of sealing and the load at end of tightening were examined by using an evaluation test device 8 of the metal gasket 1 shown in FIG. 4. FIG. 4 is a schematic explanatory view of the evaluation test device 8 of the metal gasket 1.

(1) Load at Start of Sealing

The metal gasket 1 was provided between a test platen 9a and a test platen 9b in the evaluation test device 8. Helium gas was injected from a nozzle 10a of a helium gas cylinder 10 to the evaluation test device 8, to fill the evaluation test device 8 with helium gas having an atmospheric pressure.

Next, a leaked amount of the helium gas flown into a space inside the metal gasket 1 from the outside of the metal gasket 1 was determined with a helium gas leak detector 11. At that time, a compressive load applied to the metal gasket 1 was adjusted, and the compression load when the leaked amount of the helium gas was $1 \times 10^{-11}$ Pa·m³/s·or less was regarded as a load at start of sealing. The load at start of sealing was evaluated on the basis of the following evaluation criteria.

[Evaluation Criteria]
  ○: Load at start of sealing is 1.2 kN or less.
  x: Load at start of sealing exceeds 1.2 kN.

(2) Load at End of Tightening

After the load at start of sealing was determined, the load necessary for completely tightening the metal gasket 1 was determined, and the load at end of tightening was evaluated on the basis of the following evaluation criteria.

[Evaluation Criteria]
  ○: Load at end of tightening is 3.2 kN or less.
  x: Load at end of tightening exceeds 3.2 kN.

(3) Comprehensive Evaluation

When both of the evaluation of the load at start of sealing and the evaluation of the load at end of tightening were ○, the comprehensive evaluation was judged as ○, and when the evaluation was other than the above, the comprehensive evaluation was judged as X.

Example 2

As a metal gasket, a metal gasket 1 made of aluminum, having a longitudinal sectional shape shown in FIG. 2 and FIG. 3 was used.

More specifically, the metal gasket 1 had a circular planar shape; each of the apex P and the apex Q was present within the range of the region R, respectively; the height H of the metal gasket 1 was 3.2 mm; the inner diameter of the metal gasket 1 was 20 mm; and the outer diameter of the metal gasket 1 was 25 mm. Each thickness of the upper member 3, the inner peripheral member 4 and the lower member 5 of the metal gasket 1 was 0.3 mm, respectively. The angle (inclination angle) $\theta_1$ between each of the inclined faces 6a, 6b and the horizontal surface of the metal gasket 1 was respectively, and the angle $\theta_2$ at each of the apex P and the apex Q of the angular portions 7a, 7b was 125°, respectively.

The minimum thickness portion t having a thickness of 3% of the height H of the metal gasket 1 was formed on the inclined face 6a of the upper member 3 and the inclined face 6b of the lower member 5 of the metal gasket 1, respectively. Each of the height $h_1$ and the height $h_2$ was 0.01 mm, respectively. The metal gasket 1 having the opening 2, in which the distance D between the lower surface 3b of the upper member 3 and the upper surface 5b of the lower member 5 was 40% of the height of the metal gasket 1, was used.

As the properties of the metal gasket 1, the load at start of sealing and the load at end of tightening were examined in the same manner as in Example 1. The results are shown in Table 1.

Example 3

As a metal gasket, a metal gasket 1 made of aluminum, having a longitudinal sectional shape shown in FIG. 2 and FIG. 3 was used.

More specifically, the metal gasket 1 had a circular planar shape; each of the apex P and the apex Q was present within the range of the region R, respectively; the height H of the metal gasket 1 was 3.2 mm; the inner diameter of the metal gasket 1 was 20 mm; and the outer diameter of the metal gasket 1 was 25 mm. Each thickness of the upper member 3, the inner peripheral member 4 and the lower member 5 of the metal gasket 1 was 0.3 mm, respectively. The angle (inclination angle) $\theta_1$ between each of the inclined faces 6a, 6b and the horizontal surface of the metal gasket 1 was respectively, and the angle $\theta_2$ at each of the apex P and the apex Q of the angular portions 7a, 7b was 125°, respectively.

The minimum thickness portion t having a thickness of 15% of the height H of the metal gasket 1 was formed on the inclined face 6a of the upper member 3, and on the inclined face 6b of the lower member 5 of the metal gasket 1, respectively. Each of the height $h_1$ and the height $h_2$ was 0.01 mm, respectively. The metal gasket 1 having the opening 2, in which the distance D between the lower surface 3b of the upper member 3 and the upper surface 5b of the lower member 5 was 40% of the height of the metal gasket 1, was used.

As the properties of the metal gasket 1, the load at start of sealing and the load at end of tightening were examined in the same manner as in Example 1. The results are shown in Table 1.

Example 4

As a metal gasket, a metal gasket 1 made of aluminum, having a longitudinal sectional shape shown in FIG. 2 and FIG. 3 was used.

More specifically, the metal gasket 1 had a circular planar shape; each of the apex P and the apex Q was present within the range of the region R, respectively; the height H of the metal gasket 1 was 3.2 mm; the inner diameter of the metal gasket 1 was 20 mm; and the outer diameter of the metal gasket 1 was 25 mm. Each thickness of the upper member 3, the inner peripheral member 4 and the lower member 5 of the metal gasket 1 was 0.3 mm, respectively. The angle (inclination angle) $\theta_1$ between each of the inclined faces 6a, 6b and the horizontal surface of the metal gasket 1 was 45°, respectively, and the angle $\theta_2$ at each of the apex P and the apex Q of the angular portions 7a, 7b was 125°, respectively.

The minimum thickness portion t having a thickness of 25% of the height H of the metal gasket 1 was formed on the inclined face 6a of the upper member 3, and on the inclined face 6b of the lower member 5 of the metal gasket 1, respectively. Each of the height $h_1$ and the height $h_2$ was 0.01 mm, respectively. The metal gasket 1 having the opening 2, in which the distance D between the lower surface 3b of the upper member 3 and the upper surface 5b of the lower member 5 was 40% of the height of the metal gasket 1, was used.

As the properties of the metal gasket 1, the load at start of sealing and the load at end of tightening were examined in the same manner as in Example 1. The results are shown in Table 1.

Example 5

As a metal gasket, a metal gasket 1 made of aluminum, having a longitudinal sectional shape shown in FIG. 2 and FIG. 3 was used.

More specifically, the metal gasket 1 had a circular planar shape; each of the apex P and the apex Q was present within the range of the region R, respectively; the height H of the metal gasket 1 was 3.2 mm; the inner diameter of the metal gasket 1 was 20 mm; and the outer diameter of the metal gasket 1 was 25 mm. Each thickness of the upper member 3, the inner peripheral member 4 and the lower member 5 of the metal gasket 1 was 0.3 mm, respectively. The angle (inclination angle) $\theta_1$ between each of the inclined faces 6a, 6b and the horizontal surface of the metal gasket 1 was 45°, respectively, and the angle $\theta_2$ at each of the apex P and the apex Q of the angular portions 7a, 7b was 125°, respectively.

The minimum thickness portion t having a thickness of 15% of the height H of the metal gasket 1 was formed on the inclined face 6a of the upper member 3 and the inclined face 6b of the lower member 5 of the metal gasket 1, respectively. Each of the height $h_1$ and the height $h_2$ was 0.01 mm, respectively. The metal gasket 1 having the opening 2, in which the distance D between the lower surface 3b of the upper member 3 and the upper surface 5b of the lower member 5 was 20% of the height of the metal gasket 1, was used.

As the properties of the metal gasket 1, the load at start of sealing and the load at end of tightening were examined in the same manner as in Example 1. The results are shown in Table 1.

Example 6

As a metal gasket, a metal gasket 1 made of aluminum, having a longitudinal sectional shape shown in FIG. 2 and FIG. 3 was used.

More specifically, the metal gasket 1 had a circular planar shape; each of the apex P and the apex Q was present within the range of the region R, respectively; the height H of the metal gasket 1 was 3.2 mm; the inner diameter of the metal gasket 1 was 20 mm; and the outer diameter of the metal gasket 1 was 25 mm. Each thickness of the upper member 3, the inner peripheral member 4 and the lower member 5 of the metal gasket 1 was 0.3 mm, respectively. The angle (inclination angle) $\theta_1$ between each of the inclined faces 6a, 6b and the horizontal surface of the metal gasket 1 was respectively, and the angle $\theta_2$ at each of the apex P and the apex Q of the angular portions 7a, 7b was 125°, respectively.

The minimum thickness portion t having a thickness of 15% of the height H of the metal gasket 1 was formed on the inclined face 6a of the upper member 3 and the inclined face 6b of the lower member 5 of the metal gasket 1, respectively. Each of the height $h_1$ and the height $h_2$ was 0.01 mm, respectively. The metal gasket 1 having the opening 2, in which the distance D between the lower surface 3b of the upper member 3 and the upper surface 5b of the lower member 5 was 40% of the height of the metal gasket 1, was used.

As the properties of the metal gasket 1, the load at start of sealing and the load at end of tightening were examined in the same manner as in Example 1. The results are shown in Table 1.

Example 7

As a metal gasket, a metal gasket 1 made of aluminum, having a longitudinal sectional shape shown in FIG. 2 and FIG. 3 was used.

More specifically, the metal gasket 1 had a circular planar shape; each of the apex P and the apex Q was present within the range of the region R, respectively; the height H of the metal gasket 1 was 3.2 mm; the inner diameter of the metal gasket 1 was 20 mm; and the outer diameter of the metal gasket 1 was 25 mm. Each thickness of the upper member 3, the inner peripheral member 4 and the lower member 5 of the metal gasket 1 was 0.3 mm, respectively. The angle (inclination angle) $\theta_1$ between each of the inclined faces 6a, 6b and the horizontal surface of the metal gasket 1 was respectively, and the angle $\theta_2$ at each of the apex P and the apex Q of the angular portions 7a, 7b was 125°, respectively.

The minimum thickness portion t having a thickness of 15% of the height H of the metal gasket 1 was formed on the inclined face 6a of the upper member 3 and the inclined face 6b of the lower member 5 of the metal gasket 1, respectively. Each of the height $h_1$ and the height $h_2$ was 0.01 mm, respectively. The metal gasket 1 having the opening 2, in which the distance D between the lower surface 3b of the upper member 3 and the upper surface 5b of the lower member 5 was 90% of the height of the metal gasket 1, was used.

As the properties of the metal gasket 1, the load at start of sealing and the load at end of tightening were examined in the same manner as in Example 1. The results are shown in Table 1.

Example 8

As a metal gasket, a metal gasket 1 made of aluminum, having a longitudinal sectional shape shown in FIG. 2 and FIG. 3 was used.

More specifically, the metal gasket 1 had a circular planar shape; each of the apex P and the apex Q was present within the range of the region R, respectively; the height H of the metal gasket 1 was 3.2 mm; the inner diameter of the metal gasket 1 was 20 mm; and the outer diameter of the metal gasket 1 was 25 mm. Each thickness of the upper member 3, the inner peripheral member 4 and the lower member 5 of the metal gasket 1 was 0.3 mm, respectively. The angle (inclination angle) $\theta_1$ between each of the inclined faces 6a, 6b and the horizontal surface of the metal gasket 1 was 45°, respectively, and the angle $\theta_2$ at each of the apex P and the apex Q of the angular portions 7a, 7b was 125°, respectively.

The minimum thickness portion t having a thickness of 15% of the height H of the metal gasket 1 was formed on the inclined face 6a of the upper member 3 and the inclined face 6b of the lower member 5 of the metal gasket 1, respectively. Each of the height $h_1$ and the height $h_2$ was 0.15 mm, respectively. The metal gasket 1 having the opening 2, in which the distance D between the lower surface 3b of the upper member 3 and the upper surface 5b of the lower member 5 was 90% of the height of the metal gasket 1, was used.

As the properties of the metal gasket 1, the load at start of sealing and the load at end of tightening were examined in the same manner as in Example 1. The results are shown in Table 1.

Example 9

As a metal gasket, a metal gasket 1 made of aluminum, having a longitudinal sectional shape shown in FIG. 2 and FIG. 3 was used.

More specifically, the metal gasket 1 had a circular planar shape; each of the apex P and the apex Q was present within the range of the region R, respectively; the height H of the metal gasket 1 was 3.2 mm; the inner diameter of the metal gasket 1 was 20 mm; and the outer diameter of the metal gasket 1 was 25 mm. Each thickness of the upper member 3, the inner peripheral member 4 and the lower member 5 of the metal gasket 1 was 0.3 mm, respectively. The angle (inclination angle) $\theta_1$ between each of the inclined faces 6a, 6b and the horizontal surface of the metal gasket 1 was 45°, respectively, and the angle $\theta_2$ at each of the apex P and the apex Q of the angular portions 7a, 7b was 125°, respectively.

The minimum thickness portion t having a thickness of 3% of the height H of the metal gasket 1 was formed on the inclined face 6a of the upper member 3 and the inclined face 6b of the lower member 5 of the metal gasket 1, respectively. Each of the height $h_1$ and the height $h_2$ was 0.01 mm, respectively. The metal gasket 1 having the opening 2, in which the distance D between the lower surface 3b of the upper member 3 and the upper surface 5b of the lower member 5 was 20% of the height of the metal gasket 1, was used.

As the properties of the metal gasket 1, the load at start of sealing and the load at end of tightening were examined in the same manner as in Example 1. The results are shown in Table 1.

Example 10

As a metal gasket, a metal gasket 1 made of aluminum, having a longitudinal sectional shape shown in FIG. 2 and FIG. 3 was used.

More specifically, the metal gasket 1 had a circular planar shape; each of the apex P and the apex Q was present within the range of the region R, respectively; the height H of the metal gasket 1 was 3.2 mm; the inner diameter of the metal gasket 1 was 20 mm; and the outer diameter of the metal gasket 1 was 25 mm. Each thickness of the upper member 3, the inner peripheral member 4 and the lower member 5 of the metal gasket 1 was 0.3 mm, respectively. The angle (inclination angle) 01 between each of the inclined faces 6a, 6b and the horizontal surface of the metal gasket 1 was 45°, respectively, and the angle $\theta_2$ at each of the apex P and the apex Q of the angular portions 7a, 7b was 125°, respectively.

The minimum thickness portion t having a thickness of 3% of the height H of the metal gasket 1 was formed on the inclined face 6a of the upper member 3 and the inclined face 6b of the lower member 5 of the metal gasket 1, respectively. Each of the height $h_1$ and the height $h_2$ was 0.01 mm, respectively. The metal gasket 1 having the opening 2, in which the distance D between the lower surface 3b of the upper member 3 and the upper surface 5b of the lower member 5 was 90% of the height of the metal gasket 1, was used.

As the properties of the metal gasket 1, the load at start of sealing and the load at end of tightening were examined in the same manner as in Example 1. The results are shown in Table 1.

Example 11

As a metal gasket, a metal gasket 1 made of aluminum, having a longitudinal sectional shape shown in FIG. 2 and FIG. 3 was used.

More specifically, the metal gasket 1 had a circular planar shape; each of the apex P and the apex Q was present within the range of the region R, respectively; the height H of the metal gasket 1 was 3.2 mm; the inner diameter of the metal gasket 1 was 20 mm; and the outer diameter of the metal gasket 1 was 25 mm. Each thickness of the upper member 3, the inner peripheral member 4 and the lower member 5 of the metal gasket 1 was 0.3 mm, respectively. The angle (inclination angle) $\theta_1$ between each of the inclined faces 6a, 6b and the horizontal surface of the metal gasket 1 was respectively, and the angle $\theta_2$ at each of the apex P and the apex Q of the angular portions 7a, 7b was 125°, respectively.

The minimum thickness portion t having a thickness of 25% of the height H of the metal gasket 1 was formed on the inclined face 6a of the upper member 3 and the inclined face 6b of the lower member 5 of the metal gasket 1, respectively. Each of the height $h_1$ and the height $h_2$ was 0.01 mm, respectively. The metal gasket 1 having the opening 2, in which the distance D between the lower surface 3b of the upper member 3 and the upper surface 5b of the lower member 5 was 20% of the height of the metal gasket 1, was used.

As the properties of the metal gasket 1, the load at start of sealing and the load at end of tightening were examined in the same manner as in Example 1. The results are shown in Table 1.

Example 12

As a metal gasket, a metal gasket 1 made of aluminum, having a longitudinal sectional shape shown in FIG. 2 and FIG. 3 was used.

More specifically, the metal gasket 1 had a circular planar shape; each of the apex P and the apex Q was present within the range of the region R, respectively; the height H of the metal gasket 1 was 3.2 mm; the inner diameter of the metal gasket 1 was 20 mm; and the outer diameter of the metal gasket 1 was 25 mm. Each thickness of the upper member 3, the inner peripheral member 4 and the lower member 5 of the metal gasket 1 was 0.3 mm, respectively. The angle (inclination angle) $\theta_1$ between each of the inclined faces 6a, 6b and the horizontal surface of the metal gasket 1 was respectively, and the angle $\theta_2$ at each of the apex P and the apex Q of the angular portions 7a, 7b was 125°, respectively.

The minimum thickness portion t having a thickness of 25% of the height H of the metal gasket 1 was formed on the inclined face 6a of the upper member 3 and the inclined face 6b of the lower member 5 of the metal gasket 1, respectively. Each of the height $h_1$ and the height $h_2$ was 0.01 mm, respectively. The metal gasket 1 having the opening 2, in which the distance D between the lower surface 3b of the upper member 3 and the upper surface 5b of the lower member 5 was 90% of the height of the metal gasket 1, was used.

As the properties of the metal gasket 1, the load at start of sealing and the load at end of tightening were examined in the same manner as in Example 1. The results are shown in Table 1.

Comparative Example 1

As a metal gasket, a metal gasket 1 made of aluminum, having a longitudinal sectional shape shown in FIG. 2 and FIG. 3 was used.

More specifically, the metal gasket 1 had a circular planar shape; each of the apex P and the apex Q was present within the range of the region R, respectively; the height H of the metal gasket 1 was 3.2 mm; the inner diameter of the metal gasket 1 was 20 mm; and the outer diameter of the metal gasket 1 was 25 mm. Each thickness of the upper member 3, the inner peripheral member 4 and the lower member 5 of the metal gasket 1 was 0.3 mm, respectively. The angle (inclination angle) $\theta_1$ between each of the inclined faces 6a, 6b and the horizontal surface of the metal gasket 1 was respectively, and the angle $\theta_2$ at each of the apex P and the apex Q of the angular portions 7a, 7b was 125°, respectively.

The minimum thickness portion t having a thickness of 15% of the height H of the metal gasket 1 was formed on the inclined face 6a of the upper member 3 and the inclined face 6b of the lower member 5 of the metal gasket 1, respectively. Each of the height $h_1$ and the height $h_2$ was 0.005 mm, respectively. The metal gasket 1 having the opening 2, in which the distance D between the lower surface 3b of the upper member 3 and the upper surface 5b of the lower member 5 was 40% of the height of the metal gasket 1, was used.

As the properties of the metal gasket 1, the load at start of sealing and the load at end of tightening were examined in the same manner as in Example 1. The results are shown in Table 1.

Comparative Example 2

As a metal gasket, a metal gasket 1 made of aluminum, having a longitudinal sectional shape shown in FIG. 2 and FIG. 3 was used.

More specifically, the metal gasket 1 had a circular planar shape; each of the apex P and the apex Q was present within the range of the region R, respectively; the height H of the metal gasket 1 was 3.2 mm; the inner diameter of the metal gasket 1 was 20 mm; and the outer diameter of the metal gasket 1 was 25 mm. Each thickness of the upper member 3, the inner peripheral member 4 and the lower member 5 of the metal gasket 1 was 0.3 mm, respectively. The angle (inclination angle) $\theta_1$ between each of the inclined faces 6a, 6b and the horizontal surface of the metal gasket 1 was 45°, respectively, and the angle $\theta_2$ at each of the apex P and the apex Q of the angular portions 7a, 7b was 125°, respectively.

The minimum thickness portion t having a thickness of 2% of the height H of the metal gasket 1 was formed on the inclined face 6a of the upper member 3 and the inclined face 6b of the lower member 5 of the metal gasket 1, respectively. Each of the height $h_1$ and the height $h_2$ was 0.01 mm, respectively. The metal gasket 1 having the opening 2, in which the distance D between the lower surface 3b of the upper member 3 and the upper surface 5b of the lower member 5 was 40% of the height of the metal gasket 1, was used.

As the properties of the metal gasket 1, the load at start of sealing and the load at end of tightening were examined in the same manner as in Example 1. The results are shown in Table 1.

Comparative Example 3

As a metal gasket, a metal gasket 1 made of aluminum, having a longitudinal sectional shape shown in FIG. 2 and FIG. 3 was used.

More specifically, the metal gasket 1 had a circular planar shape; each of the apex P and the apex Q was present within the range of the region R, respectively; the height H of the metal gasket 1 was 3.2 mm; the inner diameter of the metal gasket 1 was 20 mm; and the outer diameter of the metal gasket 1 was 25 mm. Each thickness of the upper member 3, the inner peripheral member 4 and the lower member 5 of the metal gasket 1 was 0.3 mm, respectively. The angle (inclination angle) $\theta_1$ between each of the inclined faces 6a, 6b and the horizontal surface of the metal gasket 1 was 45°, respectively, and the angle $\theta_2$ at each of the apex P and the apex Q of the angular portions 7a, 7b was 125°, respectively.

The minimum thickness portion t having a thickness of 26% of the height H of the metal gasket 1 was formed on the inclined face 6a of the upper member 3 and the inclined face 6b of the lower member 5 of the metal gasket 1, respectively. Each of the height $h_1$ and the height $h_2$ was 0.01 mm, respectively. The metal gasket 1 having the opening 2, in which the distance D between the lower surface 3b of the upper member 3 and the upper surface 5b of the lower member 5 was 40% of the height of the metal gasket 1, was used.

As the properties of the metal gasket 1, the load at start of sealing and the load at end of tightening were examined in the same manner as in Example 1. The results are shown in Table 1.

Comparative Example 4

As a metal gasket, a metal gasket 1 made of aluminum, having a longitudinal sectional shape shown in FIG. 2 and FIG. 3 was used.

More specifically, the metal gasket 1 had a circular planar shape; each of the apex P and the apex Q was present within the range of the region R, respectively; the height H of the metal gasket 1 was 3.2 mm; the inner diameter of the metal gasket 1 was 20 mm; and the outer diameter of the metal gasket 1 was 25 mm. Each thickness of the upper member 3, the inner peripheral member 4 and the lower member 5 of the metal gasket 1 was 0.3 mm, respectively. The angle (inclination angle) $\theta_1$ between each of the inclined faces 6a, 6b and the horizontal surface of the metal gasket 1 was respectively, and the angle $\theta_2$ at each of the apex P and the apex Q of the angular portions 7a, 7b was 125°, respectively.

The minimum thickness portion t having a thickness of 15% of the height H of the metal gasket 1 was formed on the inclined face 6a of the upper member 3 and the inclined face 6b of the lower member 5 of the metal gasket 1, respectively. Each of the height $h_1$ and the height $h_2$ was 0.01 mm, respectively. The metal gasket 1 having the opening 2, in which the distance D between the lower surface 3b of the upper member 3 and the upper surface 5b of the lower member 5 was 19% of the height of the metal gasket 1, was used.

As the properties of the metal gasket 1, the load at start of sealing and the load at end of tightening were examined in the same manner as in Example 1. The results are shown in Table 1.

Comparative Example 5

As a metal gasket, a metal gasket 1 made of aluminum, having a longitudinal sectional shape shown in FIG. 2 and FIG. 3 was used.

More specifically, the metal gasket 1 had a circular planar shape; each of the apex P and the apex Q was present within the range of the region R, respectively; the height H of the metal gasket 1 was 3.2 mm; the inner diameter of the metal gasket 1 was 20 mm; and the outer diameter of the metal gasket 1 was 25 mm. Each thickness of the upper member 3, the inner peripheral member 4 and the lower member 5 of the metal gasket 1 was 0.3 mm, respectively. The angle (inclination angle) $\theta_1$ between each of the inclined faces 6a, 6b and the horizontal surface of the metal gasket 1 was respectively, and the angle $\theta_2$ at each of the apex P and the apex Q of the angular portions 7a, 7b was 125°, respectively.

The minimum thickness portion t having a thickness of 40% of the height H of the metal gasket 1 was formed on the inclined face 6a of the upper member 3 and the inclined face 6b of the lower member 5 of the metal gasket 1, respectively. Each of the height $h_1$ and the height $h_2$ was 0.01 mm, respectively. The metal gasket 1 having the opening 2, in which the distance D between the lower surface 3b of the upper member 3 and the upper surface 5b of the lower member 5 was 91% of the height of the metal gasket 1, was used.

As the properties of the metal gasket 1, the load at start of sealing and the load at end of tightening were examined in the same manner as in Example 1. The results are shown in Table 1.

Comparative Example 6

As a metal gasket, a metal gasket 1 made of aluminum was used. In the longitudinal sectional shape shown in FIG. 3, the metal gasket did not have an angular portion, and had a plan face in the area from the apex P of the angular portion 7a of the upper member 3 to the outer peripheral end 3c of the upper member 3, and a plan face in the area from the apex Q of the angular portion 7b of the lower member 5 to the outer peripheral end 5c of the lower member 5.

More specifically, in the metal gasket 1 shown in FIG. 2 and FIG. 3, the metal gasket 1 had a circular planar shape; the height H of the metal gasket 1 was 3.2 mm; the inner diameter of the metal gasket 1 was 20 mm; and the outer diameter of the metal gasket 1 was 25 mm. Each thickness of the upper member 3, the inner peripheral member 4 and the lower member 5 of the metal gasket 1 was 0.3 mm, respectively. The angle (inclination angle) $\theta_1$ between each of the inclined faces 6a, 6b and the horizontal surface of the metal gasket 1 was 45°, respectively.

The minimum thickness portion t having a thickness of 40% of the height H of the metal gasket 1 was formed on the inclined face 6a of the upper member 3 and the inclined face 6b of the lower member 5 of the metal gasket 1, respectively. Each of the height $h_1$ and the height $h_2$ was 0.01 mm, respectively. The metal gasket 1 having the opening 2, in which the distance D between the lower surface 3b of the upper member 3 and the upper surface 5b of the lower member 5 was 20% of the height of the metal gasket 1, was used.

As the properties of the metal gasket 1, the load at start of sealing and the load at end of tightening were examined in the same manner as in Example 1. The results are shown in Table 1.

TABLE 1

| Example No. and Comparative Example No. | Properties of Metal Gasket | | |
|---|---|---|---|
| | Load at start of ealing | Load at end of tightening | Comprehensive evaluation |
| Example 1 | ○ | ○ | ○ |
| Example 2 | ○ | ○ | ○ |
| Example 3 | ○ | ○ | ○ |
| Example 4 | ○ | ○ | ○ |
| Example 5 | ○ | ○ | ○ |
| Example 6 | ○ | ○ | ○ |
| Example 7 | ○ | ○ | ○ |
| Example 8 | ○ | ○ | ○ |
| Example 9 | ○ | ○ | ○ |
| Example 10 | ○ | ○ | ○ |
| Example 11 | ○ | ○ | ○ |
| Example 12 | ○ | ○ | ○ |
| Comparative Example 1 | Δ | ○ | X |
| Comparative Example 2 | X | ○ | X |
| Comparative Example 3 | ○ | Δ | X |
| Comparative Example 4 | X | ○ | X |
| Comparative Example 5 | X | ○ | X |
| Comparative Example 6 | X | X | X |
| Example 1 | ○ | ○ | ○ |
| Example 2 | ○ | ○ | ○ |
| Example 3 | ○ | ○ | ○ |
| Example 4 | ○ | ○ | ○ |
| Example 5 | ○ | ○ | ○ |
| Example 6 | ○ | ○ | ○ |
| Example 7 | ○ | ○ | ○ |

TABLE 1-continued

| Example No. and Comparative Example No. | Load at start of ealing | Load at end of tightening | Comprehensive evaluation |
|---|---|---|---|
| Example 8 | ◯ | ◯ | ◯ |
| Example 9 | ◯ | ◯ | ◯ |
| Example 10 | ◯ | ◯ | ◯ |
| Example 11 | ◯ | ◯ | ◯ |
| Example 12 | ◯ | ◯ | ◯ |
| Comparative Example 1 | Δ | ◯ | X |
| Comparative Example 2 | X | ◯ | X |
| Comparative Example 3 | ◯ | Δ | X |
| Comparative Example 4 | X | ◯ | X |
| Comparative Example 5 | X | ◯ | X |
| Comparative Example 6 | X | X | X |

From the results shown in Table 1, it can be seen that the metal gasket obtained in each working example can secure sealability between the metal gasket and the material to be sealed by fastening the material to be sealed, such as a flange with a small tightening force, and can reduce a stress necessary for completely tightening the fastening member.

Accordingly, the metal gasket obtained in each working example can be suitably used for connecting pipes, devices, and the like, for example, in a thermal electric power plant, a nuclear power plant, a steam engine of a steam turbine ship, a petroleum refining line, a petrochemical industry process line, a semiconductor manufacturing line, and the like.

DESCRIPTION OF SYMBOLS

1: metal gasket
2: opening
3: upper member
3a: upper surface of upper member
3b: lower surface of upper member
3c: outer peripheral end of upper member
4: inner peripheral member
4a: inner peripheral surface of inner peripheral member
4b: outer peripheral surface of inner peripheral member
5: lower member
5a: lower surface of lower member
5b: upper surface of lower member
5c: outer peripheral end of lower member
6a: inclined face of upper member
6b: inclined face of lower member
7a: angular portion of upper member
7b: angular portion of lower member
8: evaluation test device
9a: test platen
9b: test platen
10: helium gas cylinder
10a: nozzle
11: helium gas leak detector
D: distance between lower surface of upper member and upper surface of lower member
P, Q: apex of angular portion
R: area between midpoint of width of metal gasket and inner peripheral surface of inner peripheral member
M: midpoint of lower surface of upper member
N: midpoint of lower surface of lower member
$h_1$: height from upper surface of upper member to apex P of angular portion
$h_2$: height from lower surface of lower member to apex Q of angular portion
t: minimum thickness portion

The invention claimed is:

1. A metal gasket having an opening on an outer peripheral end, an annular shape in a plane shape, and a horizontal U-shape in a vertical sectional view,
wherein the metal gasket has an upper section, an inner peripheral section and a lower section,
wherein a first inclined face toward an inner peripheral direction is formed at a boundary between an upper surface of the upper section and an inner surface of the inner peripheral section, and a second inclined face toward an inner peripheral direction is formed at a boundary between a lower surface of the lower section and an inner surface of the inner surface section, respectively, and the inclined face has an area of a minimum thickness of 3 to 25% of the height of the metal gasket,
wherein each of the upper section and the lower section has an angular portion having a shape of a mountain in a vertical sectional view, respectively, and each of a height from the upper surface of the upper section to an apex of the angular portion having a shape of a mountain on the upper section, and a height from the lower surface of the lower section to an apex of the angular portion having a shape of a mountain on the lower section is 0.01 mm or more,
wherein a distance between a lower surface of the upper section and an upper surface of the lower section in the opening is 20 to 90% of the height of the metal gasket,
wherein an upper apex of the angular portion on the upper section is present in a region between the outer peripheral surface of the inner peripheral section and a first midpoint of the lower surface of the upper section, and
wherein a lower apex of the angular portion on the lower section is present in a region between the outer peripheral surface of the inner peripheral section and a second midpoint of the upper surface of the lower section.

2. The metal gasket according to claim 1, wherein the metal gasket is formed from a metal selected from the group consisting of aluminum, an aluminum alloy, stainless steel, Inconel, carbon steel, lead, gold, silver, copper, nickel, tantalum, chromium molybdenum steel, Monel, titanium and a magnesium alloy.

3. The metal gasket according to claim 1, wherein each of the apex of the angular portion on the upper section and the apex of the angular portion on the lower section is sharp.

4. The metal gasket according to claim 1, wherein an inclination angle between each of the first inclined face and the second inclined face, and a horizontal surface of the metal gasket is 20° to 80°.

5. The metal gasket according to claim 1, wherein the height from the upper surface of the upper section to an apex of the angular portion having a shape of a mountain on the upper section, and the height from the lower surface of the lower section to an apex of the angular portion having a shape of a mountain on the lower section is 0.3 mm or less.

6. The metal gasket according to claim 1, wherein the height from the upper surface of the upper section to an apex of the angular portion having a shape of a mountain on the upper section, and the height from the lower surface of the lower section to an apex of the angular portion having a shape of a mountain on the lower section is 0.2 mm or less.

7. The metal gasket according to claim 1, wherein the distance between the lower surface of the upper section and the upper surface of the lower section in the opening is 25% or more of the height of the metal gasket.

8. The metal gasket according to claim 1, wherein the distance between the lower surface of the upper section and the upper surface of the lower section in the opening is 80% or less of the height of the metal gasket.

9. The metal gasket according to claim 1, wherein the distance between the lower surface of the upper section and the upper surface of the lower section in the opening is 25 to 80% of the height of the metal gasket.

\* \* \* \* \*